United States Patent
Lotzenburger et al.

(10) Patent No.: US 8,543,740 B2
(45) Date of Patent: Sep. 24, 2013

(54) APPARATUS AND METHOD FOR INCREASED ADDRESS RANGE OF AN I²C OR I²C COMPATIBLE BUS

(75) Inventors: Lars Lotzenburger, Erding (DE); Richard Oed, Erding (DE)

(73) Assignee: Texas Instruments Deutschland GmbH, Freising (DE)

( * ) Notice: Subject to any disclaimer, the term of this patent is extended or adjusted under 35 U.S.C. 154(b) by 430 days.

(21) Appl. No.: 13/010,481

(22) Filed: Jan. 20, 2011

(65) Prior Publication Data
US 2011/0202698 A1  Aug. 18, 2011

(30) Foreign Application Priority Data
Jan. 20, 2010  (DE) ................ 10 2010 005 104

(51) Int. Cl.
*G06F 3/00* (2006.01)
*G06F 13/00* (2006.01)
*G06F 13/20* (2006.01)

(52) U.S. Cl.
USPC ........... 710/9; 710/2; 710/3; 710/4; 710/8; 710/10; 710/110; 710/104; 710/306; 710/311; 710/313; 710/314

(58) Field of Classification Search
USPC ........... 710/2–4, 8–10, 104, 110, 306, 311, 710/313, 314
See application file for complete search history.

(56) References Cited

U.S. PATENT DOCUMENTS

| | | | |
|---|---|---|---|
| 6,745,270 B1 * | 6/2004 | Barenys et al. ............. | 710/104 |
| 6,842,806 B2 * | 1/2005 | Ervin ............................ | 710/110 |
| 6,874,052 B1 * | 3/2005 | Delmonico .................. | 710/305 |
| 7,284,079 B2 * | 10/2007 | Ervin ............................ | 710/110 |
| 7,587,539 B2 * | 9/2009 | Picard et al. ................ | 710/104 |
| 7,606,956 B2 * | 10/2009 | Deshpande et al. .......... | 710/110 |
| 2008/0147941 A1 * | 6/2008 | Deshpande et al. .......... | 710/110 |
| 2008/0162758 A1 * | 7/2008 | Gideons ....................... | 710/110 |
| 2008/0201511 A1 * | 8/2008 | Deshpande et al. .......... | 710/110 |
| 2008/0215779 A1 * | 9/2008 | Deshpande et al. .......... | 710/110 |
| 2010/0169526 A1 * | 7/2010 | Kim .............................. | 710/110 |
| 2010/0306431 A1 * | 12/2010 | Adkins et al. ................ | 710/110 |

OTHER PUBLICATIONS

DE Search Report, dated Jul. 23, 2010.

* cited by examiner

*Primary Examiner* — Henry Tsai
*Assistant Examiner* — Eric Oberly
(74) *Attorney, Agent, or Firm* — Alan A. R. Cooper; W. James Brady, III; Frederick J. Telecky, Jr.

(57) ABSTRACT

An integrated circuit (IC) configured to operate as a slave on an inter-integrated circuit (I²C) or I²C compatible bus. The IC is further configured to receive an address through the I²C bus and store the received address in a register, so as to be identified by the address. A method of address assignment in a master/slave system, the system comprises at least one master, a plurality of slaves, and an I²C or I²C compatible bus. The method comprises sending a first address by the master on the I²C bus to a first of the plurality of slaves and storing the first address on the first slave to identify the first slave by the first address. The method further comprises sending a second address by the master on the I²C bus to a second of the plurality of slaves and storing the second address on the second slave to identify the second slave by the second address. The steps of sending and storing are repeated until all slaves of the system have stored an address.

12 Claims, 2 Drawing Sheets

APPARATUS AND METHOD FOR INCREASED ADDRESS RANGE OF AN I²C OR I²C COMPATIBLE BUS

CROSS-REFERENCE TO RELATED APPLICATIONS

This application is claims priority from German Patent Application No. 10 2010 005 104.7, filed Jan. 20, 2010, which is hereby incorporated by reference for all purposes.

TECHNICAL FIELD

The invention relates to an integrated circuit (IC) configured to operate as a slave on an inter-integrated circuit (I²C) or I²C compatible bus and to a method of address assignment in a master/slave system.

BACKGROUND

An I²C bus, also written as I2C bus, is a serial bus. The bus is mostly used for communication between different ICs in a system. I²C compatible busses are for example the SM bus (system management bus) and the display data channel bus. Other examples of I²C compatible busses are the ACCESS bus, the power management bus (PM bus) and the 2-wire interface bus (TWI). Here, the term "I²C bus" refers to an I²C or compatible bus. An I²C bus comprises a serial clock line (SCL) and a serial data line (SDA).

In a system that employs and I²C bus, there is a master and one or more slaves coupled to the I²C bus. Each slave is generally identified by a unique address to allow individual communication between the master and each slave. Data is transmitted on the I²C bus in bytes (usually 8 bits), but there are also systems with that employ 10 bit bytes. Within the I²C standard, an address length is the number of bits in one byte minus one bit (i.e., 7 or 9 bits), where the remaining bit is a read/write bit indicating whether the master requests read or write access. Typically, slaves have an address which is either fixed or of can be changed using dedicated address pins.

Address assignment to the slaves in a master/slave system using an I²C bus should be carefully planned. Manufacturers should decide which I²C slave addresses are to be assigned to newly developed I²C slave devices. For example, today, different part numbers exist for I²C slave devices having the same functionality but different address areas. One solution used for avoiding an address conflict on an I²C bus is to install I²C switches which split the bus into multiple sub-busses. However, this can require an additional circuit and more software overhead since the switch is controlled using the I²C bus itself. Additionally, a switch may not be sufficient if a lot of I²C slaves having the same address are within a system.

SUMMARY

It is an object of the invention to provide an IC configured to operate as a slave on an I²C bus and which provides more flexibility for the address assignment to the slaves.

The invention provides an IC configured to operate as a slave on an I²C bus, wherein the IC is further configured to receive an address through the I²C bus and store the received address in a register, so as to be identified by the address. Thus, an address is assigned once to each IC in an initialization phase, and then the received address is stored within the IC which is identified by the address. Initialization should be applied during power-up and only be repeated after a change in the system.

In an aspect of the invention, the IC comprises an observer for detecting a not-acknowledged bit on the bus. The IC is configured to store the received address so as to be identified by the address if and only if a not-acknowledge bit NACK is detected.

According to the I²C protocol, the master first sets a START condition. Then, in a first byte, 7 address bits are sent followed by a read/write bit. A slave to which this address is assigned, answers with an acknowledge bit ACK in the 9th clock cycle. Only if there is a not-acknowledge bit NACK, the address is not yet assigned and the inventive IC may store this address so as to be identified by it.

In a further aspect of the invention, the IC comprises a first and a register. An address received through the I²C bus can be stored temporarily in the register and if a not-acknowledge bit is detected and only then the temporarily stored address is stored into the register so that the IC is to be identified by the address.

In another aspect, the IC comprises a bus lead-through and a switching device, wherein the switching device is configured to open or close the bus lead-through. In the state of the art, slave devices are connected to the serial bus without the serial bus passing through the slave device, therefore, the slave devices cannot physically open or close the bus lines.

In another aspect, the IC, which has not yet an address, opens the serial bus. Thus, the address sent by the master is only transmitted up to the last slave device on the serial bus not yet being identified by an address.

In another aspect, the IC is configured to close the bus lead-through once it has stored a received address so as to be identified by the address. The invention further provides a method of address assignment in a master/slave system, wherein the system comprises at least one master and a plurality of slaves and an I²C bus.

The method comprises a first step wherein a first address is sent by the master on the I²C bus to a first of the plurality of slaves and a second step wherein the first address is stored on the first slave to identify the first slave by the first address. In a third step a second address is sent by the master on the I²C bus to a second of the plurality of slaves and in the next step the second address is stored on the second slave to identify the second slave by the second address. The steps of sending and storing are repeated until all slaves of the system have stored an address so as to be identified by this address.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 1:
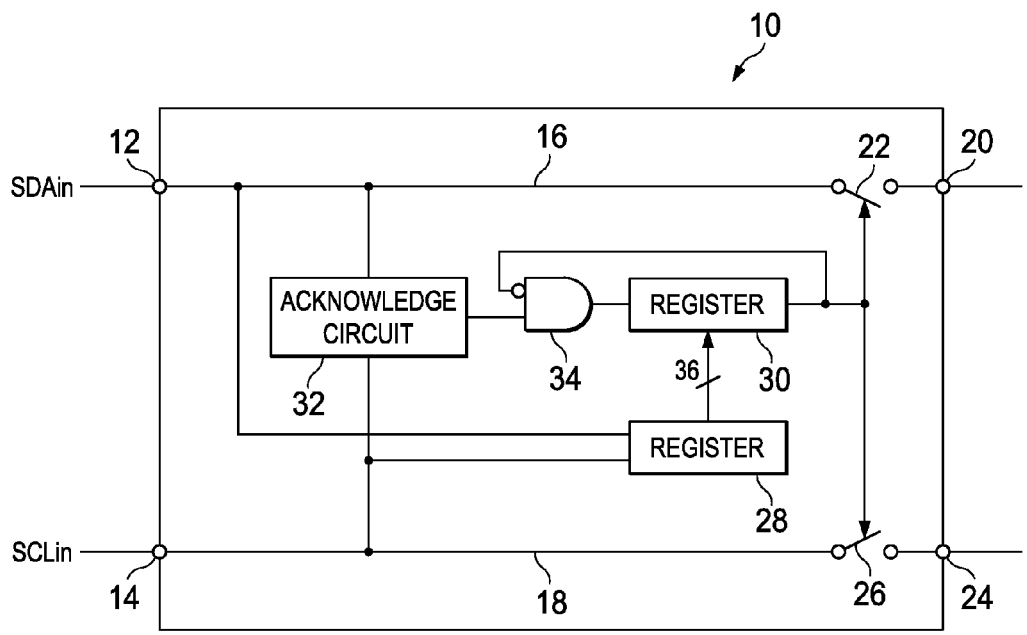
FIG. 1 is a simplified schematic diagram of an integrated circuit (IC)

FIG. 1 shows schematically an integrated circuit (IC) 10 comprising an input 12 for connecting a serial data line and an input 14 for connecting a serial clock line of an I²C bus. The IC 10 further comprises a bus lead-through with a lead-through 16 for the serial data line and a lead-through 18 for the serial clock line. Lead-through 16 interconnects input 12 to a serial data line output 20 and can be interrupted by a switch 22. Serial clock line lead-through 18 interconnects input 14 to a serial clock line output 24 and can be interrupted by a switch 26.

On the serial clock line SCL a clock signal is transmitted which is sent by the master device. On the serial data line SDA the data is transmitted in form of bytes.

IC 10 further comprises a register 28, a register 30, an acknowledge circuit 32 for detecting a not-acknowledge bit NACK and an AND-gate 34. First and registers 28 and 30 comprise at least as much bits as are in an address (i.e., for a common I²C bus 7 bits).

Register 28 is connected with a clock input via input 14 to the serial clock line and with a serial data input via input 12 to the serial data line. Register 28 is further connected with a parallel data output to a parallel data input of register 30 by a line 36. Line 36 comprises at least as much lines in parallel as there are address bits (i.e., for a common I²C bus 7 lines).

Acknowledge circuit 32 is connected with a data input via input 12 to the serial data line SDA and with a clock input via input 14 to the serial clock line SCL. Acknowledge circuit 32 is further connected with a signal output to an input of AND-gate 34.

Register 30 has an enable input connected to an output of AND-gate 34 and a signal output which is connected for controlling switches 22 and 26. The signal output of register 30 is further connected to an inverted input of AND-gate 34. The signal output is an address assigned signal or bit indicating whether an address is stored in register 30 or not.

In operation, input 12 and input 14 are connected to an I²C bus to which at least a master is connected. The I²C bus interconnects all devices of a system which may contain a plurality of slaves. Switches 22 and 26 in IC 10 are initially open and registers 28 and 30 do not contain address bits, IC can not be identified by an address.

The master first sets a START condition. Then, in a first byte, 7 address bits are sent followed by a read/write bit. According to the I²C standard, acknowledgment takes place after every byte. That is, acknowledge takes place during the 9th clock cycle or clock pulse.

The acknowledge signal is defined as follows: The transmitter, which is in the case of address transmission the master, releases the SDA line during the acknowledge clock pulse so that the receiver, which is in the case of address transmission the slave, can pull the SDA line low and keep the voltage level stably low during the high period of the 9th clock pulse.

When the voltage level on SDA remains high during the 9th clock pulse, this is defined as a not-acknowledge signal. The master will then generate either a STOP condition to abort the transfer or a repeated START condition to start a new transfer.

Acknowledge circuit 32 is configured to detect the 9th clock period and to detect whether the SDA line is high during the 9th clock pulse. Register 28 is clocked by the clock signal received at its clock input and stores temporarily the address sent on serial data line SDA by the master device. During the 9th clock period, IC 10 will not-acknowledge because the address sent is not yet the address by which the IC 10 is identified. If no other slave in the system is identified by the address sent, no device will pull down the level on the SDA line. Then, acknowledge circuit 32 will detect a not-acknowledge bit NACK and output an NACK signal at its signal output which is connected to an input of AND-gate 34. As AND-gate 34 further receives at its inverted input a signal indicating that register 30 has not yet an address stored, AND-gate 34 will output a signal enabling register 30 to receive on its parallel data input the address bits temporarily stored in register 28. In this case the address bits stored in register 28 will be transferred to second address register 30 by line 36.

After the transfer of address bits from the register 28 to the register 30, address register 30 changes its signal output, i.e. the voltage level at the signal output to "address assigned=true" which is a signal to close switches 22 and 26 of register 30. Switches 22 and 26 may be switches for a small propagation delay or realized as buffers to be compatible with a maximum bus capacitance according to the I²C standard of 400 pF.

The master also detects the not-acknowledge bit NACK and will either send another address or resend for verification purposes the same address after a restart condition. IC 10 may store the newly received address in register 28. If it is another address which is not assigned to any other slave in the system, acknowledge circuit 32 will detect a not-acknowledge bit NACK and send accordingly a signal to AND-gate 34. However, the signal output at register 30 changed because register 30 now contains an address so as to identify the IC 10 by it. Therefore, AND-gate 34 will not enable register 30 to receive the address bits temporarily stored in register 28.

If the master resends the same address as beforehand, IC 10 will now be identified by the address and send an acknowledge bit. Acknowledge circuit 32 will not detect a not-acknowledge bit and there will be no change in the register 30.

Figure 2:
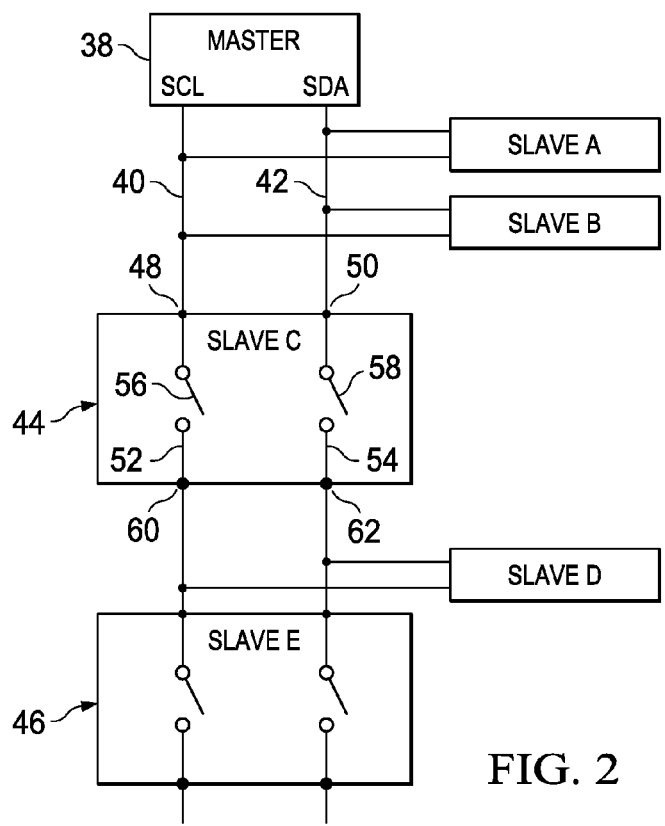
FIG. 2 is a simplified schematic diagram of a master/slave system communicating via an I²C bus.

FIG. 2 shows the interconnection in a master/slave system. A master 38 is connected to a serial clock line SCL 40 and a serial data line SDA 42. Three conventional slave devices named slave A, slave B and slave D are connected with an input to the serial data line 42 and with a second input to the serial clock line 40. They have fixed addresses.

FIG. 2 further shows two ICs 44 and 46 according to the invention configured to operate as a slave C and a slave E. IC 44 has an input 48 connected to the serial clock line 40 and an input 50 connected to the serial data line 42. IC 44 is connected to the I²C bus formed by lines 40 and 42 after, i.e. downstream the connections of slave A and slave B seen from the master 38.

IC 44 comprises a lead-through 52 for the serial clock line and a lead-through 54 for the serial data line. Both lines may be interrupted by switches 56 and 58, respectively. IC 44 further comprises an output 60 for the serial clock line and an output 62 for the serial data line. At outputs 60 and 62 the I²C bus continues. Conventional slave D is connected to the serial bus lines downstream slave C.

IC 46 is connected to the serial bus I²C downstream the connection of conventional slave D. Similar to IC 44, IC 46 comprises inputs and outputs for the serial clock line and the serial data line as well as lead-throughs for both lines which may be interrupted by switches.

Downstream IC 46, the serial bus or I²C bus is shown to continue at the outputs of IC 46. The system may comprise more conventional slaves and/or more ICs according to the invention.

The fixed addresses of slaves A, B and D are given to the master as known in the state of the art, whereas the master assigns addresses to slaves C and E in an initialization phase. Initially, the respective switches in ICs 44 and 46 are open. As discussed with reference to FIG. 1, the master first sets a START condition and then sends a byte with a first address on I²C bus on line 42, the serial data line. This address will be received by slaves A, B and C. As slave C has not yet an address, switches 56 and 58 are open. Thus, neither slave D nor IC 46 operating as slave E will receive the first address sent by master 38. Neither slave A nor slave B will send an acknowledge bit, because the master will be programmed to send in the initialization phase no addresses already assigned to conventional slaves.

IC 44, which operates as a slave C, will first store the address temporarily into its register. In the 9th clock cycle the observer in IC 44 will detect a not-acknowledge bit and as there is not yet an address stored in the register the temporarily stored address will be transferred from the register to the register so that IC 44 will be identifiable by this address. Switches 56 and 58 will be closed.

Master 38 will also detect the not-acknowledge bit and restart sending for example the same address. As switches 56 and 58 are closed, this address will be transmitted also to slave D and IC 46 operating as slave E. Slave C and slave E will store temporarily in their respective registers the address sent by master 38. Slave C will now recognize this address as its address and send during the 9th clock cycle an acknowledge bit. Thus, the observer in IC 46 will not detect a not-acknowledge bit and will not take this address as its own address.

Master 38 will note assignment of this address and start to send the next address to be attributed. This new address will be received by all slaves A to E. None of slaves A to D will send an acknowledge bit because the address is not their address. Slave C and slave E will store the address in their respective registers. The respective observers in ICs 44 and 46 will detect a not-acknowledge bit. In IC 44 switches 56 and 58 are already closed and there is already an address stored in the register. Therefore, IC 44 will not transfer the temporarily stored address from the register into the register. In IC 46 the switches are not yet closed and there is no address stored in the register. Therefore, the temporarily stored address will be transferred from the first to the register so that slave E may now be identified by this address. When master 38 restarts to send the same address, slave E will send an acknowledge bit as it is now identified by this address.

Figure 3:
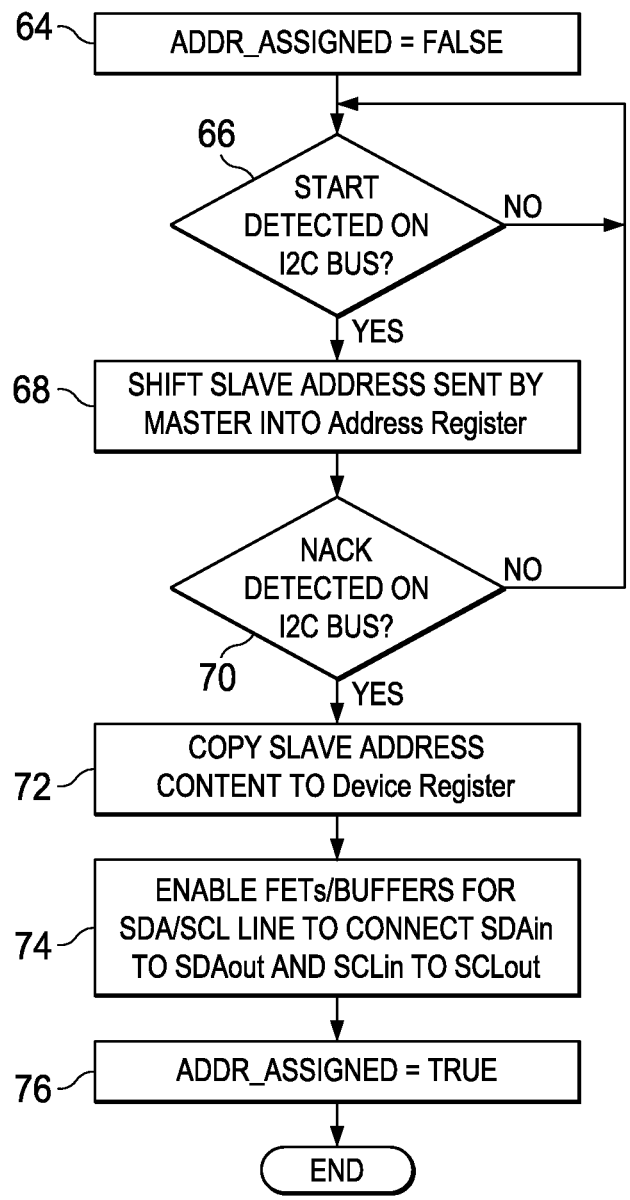
FIG. 3 is a flow diagram of the address assignment method.

FIG. 3 shows in a flow diagram the different steps performed in an inventive device 10, 44, 46. In a first step 64 the signal or rather bit called "address assigned" is set as false. This corresponds to the signal or voltage level output at the signal output of register 30 in FIG. 1.

In a step 66 IC 10, 44, 46 observes whether it detects a START condition on the I²C bus. If not, it continues to look for a START condition, if yes the slave address sent by the master is stored into the register 28 (FIG. 1) which is called address register in the flow diagram. In a next step 70 it is decided whether acknowledge circuit 32 has detected a not-acknowledge bit NACK on the I²C bus. If not, the IC 10, 44, 46 continues to look for a START condition. If a not-acknowledge bit NACK has been detected, the slave address sent by the master and stored in the register 28 is copied in a step 72 into the so-called device register which corresponds to register 30 (FIG. 1) in IC 10.

In a next step 74, switches 22 and 26 are closed. These switches may be realized by FETs or by buffers. They establish a complete lead-through of the serial data line and the serial clock line of the I²C bus. In a next step 76, the signal or bit called "address assigned" is set to true. This indicates that the voltage level at the signal output of register 30 is changed.

Therefore, the routine shown in FIG. 3 is not entered anymore because, in step 64, the bit "address assigned" is set to false.

The embodiment according to FIG. 3 slightly differs from the embodiment explained with reference to FIG. 2 in that newly incoming addresses are not stored temporarily in the register 28 if an address is already assigned. Both embodiments are possible.

Having thus described the invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the invention may be employed without a corresponding use of the other features. Accordingly, it is appropriate that the appended claims be construed broadly and in a manner consistent with the scope of the invention.

The invention claimed is:

1. An apparatus comprising an integrated circuit (IC) that is configured to operate as an inter-integrated circuit (I2C) slave connected to a master coupled to an I2C bus, wherein the IC includes:
    a data-in terminal;
    a clock-in terminal;
    a data-out terminal;
    a clock-out terminal;
    a first register that is coupled to the data-in terminal and the clock-in terminal, wherein the first register is configured to store an address transmitted by the master over the I2C bus;
    an acknowledge circuit that is coupled to the data-in terminal and the clock-in terminal, wherein the acknowledge circuit is configured to generate a not-acknowledge signal when no other slave has acknowledged the address as its address;
    a logic circuit that is coupled to the acknowledge circuit, wherein the logic circuits receives the generated not-acknowledge signal; and
    a second register that is coupled to the logic circuit and the first register, wherein the second register is configured to receive the address from the first register when the acknowledge circuit generates the not-acknowledge signal and the IC is configured to be identified by the address when the address is stored in the second register.

2. The apparatus of claim 1, wherein the IC further comprises:
    a first switch that is coupled between the data-in terminal and the data-out terminal; and
    a second switch that is coupled between the clock-in terminal and the clock-out terminal, wherein the second register is configured to generate an actuation signal to actuate the first and second switches when the when the acknowledge circuit generates the not-acknowledge signal.

3. The apparatus of claim 2, wherein the logic circuit further comprises an AND gate that is coupled to the acknowledge circuit.

4. The apparatus of claim 3, wherein the AND gate receives an Inverse of the actuation signal.

5. A method for operating an integrated circuit (IC) as an inter-integrated circuit (I2C) slave connected to a master on an I2C bus, the method comprising:
    receiving at the IC an address issued by a master onto an I2C bus, wherein the IC includes a data-in terminal, a clock-in terminal, a data-out terminal, a clock-out terminal, a first register, a second register, a acknowledge circuit, and a logic circuit;

temporarily storing the address into the first register;

detecting by the IC whether another slave on the I2C bus has acknowledged the address;

generating by the acknowledge circuit a not-acknowledge signal when no other slave has acknowledged the address as its address;

receiving by the logic circuit, the not-acknowledge signal generated by the acknowledge circuit;

receiving and storing the address from the first register in the second register when no other slave has acknowledged the address; and acknowledging that the address corresponds to the IC when the address is stored in the second register.

6. The method of claim 5, wherein the step of acknowledging further comprises generating an actuation signal; and actuating a first switch and a second switch with the actuation signal, wherein each of the first and second switches is coupled to the I2C bus.

7. The method of claim 6, wherein the step of storing further comprises:

logically combining the not-acknowledge signal with an Inverse of the actuation signal; and storing the address in the second register in response to the logical combining of the not-acknowledge signal with the inverse of the actuation signal.

8. The method of claim 6, wherein the step of logically combining further comprises ANDing the not-acknowledge signal with an inverse of the actuation signal.

9. An apparatus comprising:

I2C bus having a data line and a clock line;

a master that is coupled to the I2C bus; and a plurality of slaves that are each coupled to the I2C bus, wherein at least one slave includes:

a data-in terminal that is coupled to the data line;

a clock-in terminal that is coupled to the clock line;

a data-out terminal that is coupled to the data line;

a clock-out terminal that is coupled to the clock line;

a first register that is coupled to the data-in terminal and the clock-in terminal, wherein the first register stores an address transmitted by the master over the I2C bus;

an acknowledge circuit that is coupled to the data-in terminal and the clock-in terminal, wherein the acknowledge circuit is configured to generate a not-acknowledge signal when no other slave has acknowledged the address as its address;

a logic circuit that is coupled to the acknowledge circuit, wherein the logic circuits receives the generated not-acknowledge signal; and a second register that is coupled to the logic circuit and the first register, wherein the second register is configured to receive the address from the first register when the acknowledge circuit generates the not-acknowledge signal and the slave is configured to be identified by the address when the address is stored in the second register.

10. The apparatus of claim 9, wherein the each slave further comprises:

a first switch that is coupled between the data-in terminal and the data-out terminal;

a second switch that is coupled between the clock-in terminal and the clock-out terminal, wherein the second register is configured to generate an actuation signal to actuate the first and second switches when the when the acknowledge circuit generates the not-acknowledge signal.

11. The apparatus of claim 10, wherein the logic circuit further comprises an AND gate that is coupled to the acknowledge circuit.

12. The apparatus of claim 11, wherein the AND gate receives an inverse of the actuation signal.

* * * * *